United States Patent
Li et al.

(10) Patent No.: US 9,885,464 B2
(45) Date of Patent: Feb. 6, 2018

(54) FILAMENT LAMP SET IN DRINK BOTTLE

(71) Applicant: Lixin Li, Guangzhou (CN)

(72) Inventors: Lixin Li, Guangzhou (CN); Yi Yang, Guangzhou (CN)

(73) Assignee: Lixin Li (CN)

( * ) Notice: Subject to any disclaimer, the term of this patent is extended or adjusted under 35 U.S.C. 154(b) by 0 days.

(21) Appl. No.: 15/255,171

(22) Filed: Sep. 2, 2016

(65) Prior Publication Data

US 2017/0122531 A1    May 4, 2017

(30) Foreign Application Priority Data

Oct. 29, 2015    (CN) .......................... 2015 1 0732463

(51) Int. Cl.

| | |
|---|---|
| F21V 19/00 | (2006.01) |
| F21V 3/00 | (2015.01) |
| F21V 23/00 | (2015.01) |
| F21V 17/12 | (2006.01) |
| F21K 9/235 | (2016.01) |
| F21V 23/02 | (2006.01) |
| F21V 33/00 | (2006.01) |
| B65D 51/24 | (2006.01) |
| F21Y 115/10 | (2016.01) |

(52) U.S. Cl.
CPC ............ F21V 17/12 (2013.01); B65D 51/248 (2013.01); F21K 9/235 (2016.08); F21V 23/001 (2013.01); F21V 23/02 (2013.01); F21V 33/0036 (2013.01); *F21Y 2115/10* (2016.08)

(58) Field of Classification Search
CPC ....... H01J 5/60; B65D 41/06; B65D 41/0471; B65D 41/0485; B65D 5/6644; B65D 25/02; F21K 9/237
See application file for complete search history.

(56) References Cited

U.S. PATENT DOCUMENTS

| | | | | |
|---|---|---|---|---|
| 871,588 | A * | 11/1907 | Hinsberger | ............ B65D 41/06 |
| | | | | 215/332 |
| 2,000,947 | A * | 5/1935 | Adalbert | ................ B65D 41/04 |
| | | | | 220/288 |

(Continued)

FOREIGN PATENT DOCUMENTS

| | | |
|---|---|---|
| CN | 2611730 Y | 4/2004 |
| CN | 201434211 Y | 3/2010 |

(Continued)

*Primary Examiner* — Mariceli Santiago
(74) *Attorney, Agent, or Firm* — Schmeiser, Olsen & Watts, LLP

(57) ABSTRACT

A filament lamp set in a drink bottle is provided, including a light emitting unit, wherein the outer side of the light emitting unit is sleeved by a connecting mechanism which can be fixedly connected with the mouth of a bottle body; an opening is formed in at least one end of the connecting mechanism; the light emitting unit extends out from the opening. The bottle body adopts the common drink bottle, by which the connecting mechanism can be matched with the mouth of the bottle so as to fix the bottle body in the connecting mechanism. In addition, the light emitting unit is sleeved by the bottle body. Based on the decorative patterns, colors and the like on the bottle body, different effects can be achieved by the emitted light and faculae, thus achieving the purpose of decoration.

6 Claims, 5 Drawing Sheets

(56) References Cited

U.S. PATENT DOCUMENTS

Figure 1:
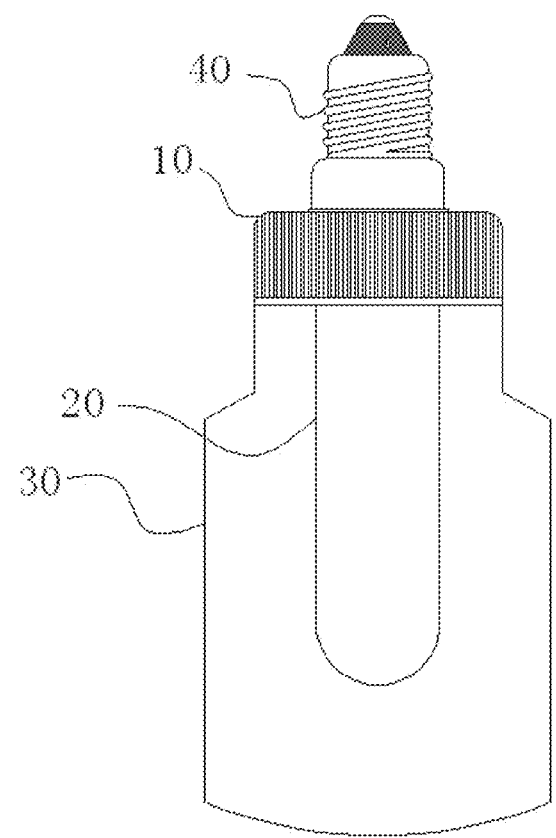

| | | | | |
|---|---|---|---|---|
| 3,609,641 A | * | 9/1971 | Luce | H01R 33/9756 439/385 |
| 2013/0168395 A1 | * | 7/2013 | Allen | B65D 55/10 220/288 |
| 2014/0003037 A1 | * | 1/2014 | Kuelzow | F21V 33/0024 362/101 |
| 2014/0071663 A1 | * | 3/2014 | Callanan | F21L 4/08 362/154 |
| 2015/0036325 A1 | * | 2/2015 | Cohen | F21S 10/066 362/124 |

FOREIGN PATENT DOCUMENTS

| | | | | |
|---|---|---|---|---|
| CN | 103863686 A | | 6/2014 | |
| JP | 2004196370 A | * | 7/2004 | |
| WO | WO 2013164748 A1 | * | 11/2013 | B65D 51/248 |

* cited by examiner

FILAMENT LAMP SET IN DRINK BOTTLE

CROSS-REFERENCE TO RELATED APPLICATION

This application claims priority to CN 201510732463.1, having a filing date of Oct. 29, 2015, the entire contents of which are hereby incorporated by reference.

FIELD OF TECHNOLOGY

The following relates to a lamp, and in particular to a filament lamp set in a drink bottle.

BACKGROUND

A large number of drink bottles tend to be left after people finish their drink, and to be discarded or cycled in places such as gatherings, parties, and bars, where light plays an important role in creating a good atmosphere. If light emitted from lamps can penetrate through the drink bottles that are with different decorative patterns, unevenness and colors, various faculae or rays can be generated to achieve a pleasant atmosphere and realize the utilization of waste materials.

SUMMARY

An aspect relates to a filament lamp set in a drink bottle, including a light emitting unit, wherein the outer side of the light emitting unit is sleeved by a connecting mechanism which can be fixedly connected with the mouth of a bottle body; an opening is formed in at least one end of the connecting mechanism; the light emitting unit extends out from the opening.

Further, the connecting mechanism is a hollow body with internal threads, wherein a gap to be inserted into the mouth of the bottle body is reserved between the connecting mechanism and the light emitting unit, and the internal threads are matched with external threads at the mouth of the bottle body.

Further, a connecting head which can be connected with an external lamp base is arranged at one end of the light emitting unit, and the connecting head protrudes from the connecting mechanism.

Further, the light emitting unit is an LED lamp.

Further, the connecting mechanism is a barrel, wherein the side wall of the connecting mechanism is provided with threaded holes, inside which the adjusting bolts that can move along the threaded holes are arranged. The adjusting bolts penetrate through the side wall of the connecting mechanism.

Further, one end inside the connecting mechanism, of each adjusting bolt, is taper-shaped.

Further, one end inside the connecting mechanism, of each adjusting bolt, is sleeved by an arc-shaped support piece in the axial direction; the adjusting bolts can rotate relative to the arc-shaped support pieces, and the arc-shaped support pieces closely contact with the side wall of the opening of the bottle body.

The bottle body adopts the common drink bottle, by which the connecting mechanism can be matched with the mouth of the bottle so as to fix the bottle body in the connecting mechanism. In addition, the light emitting unit is sleeved by the bottle body. Based on the decorative patterns, colors and the like on the bottle body, different effects can be achieved by the emitted light and faculae, thus achieving the purpose of decoration.

BRIEF DESCRIPTION

Figure 2:
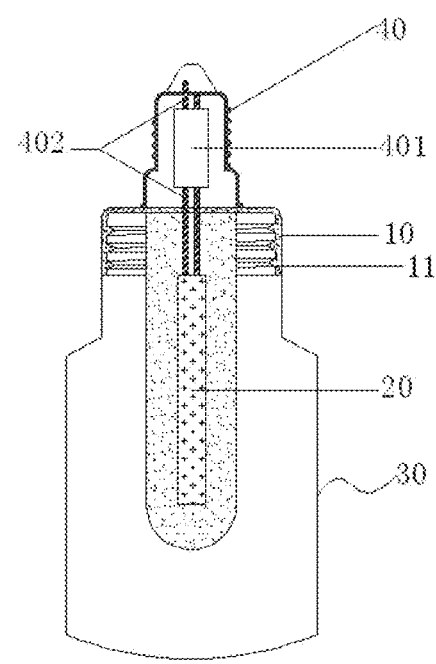
Figure 3:
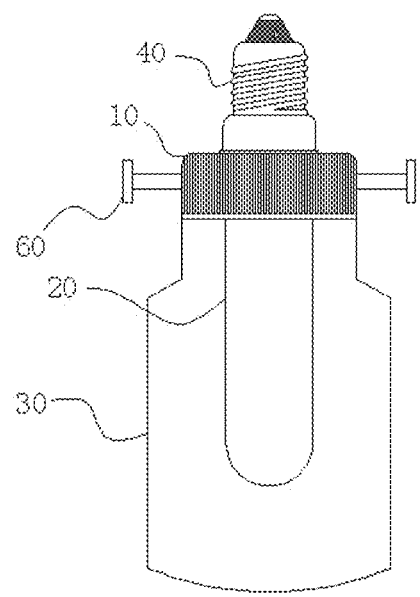
Figure 4:
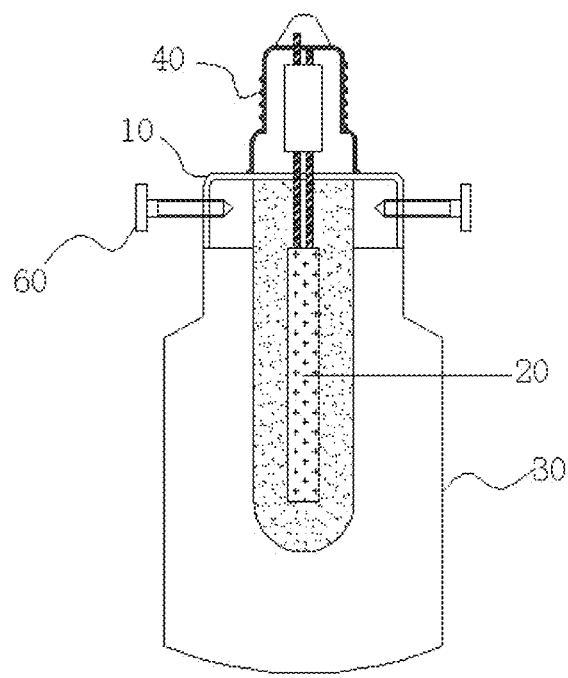
Figure 5:
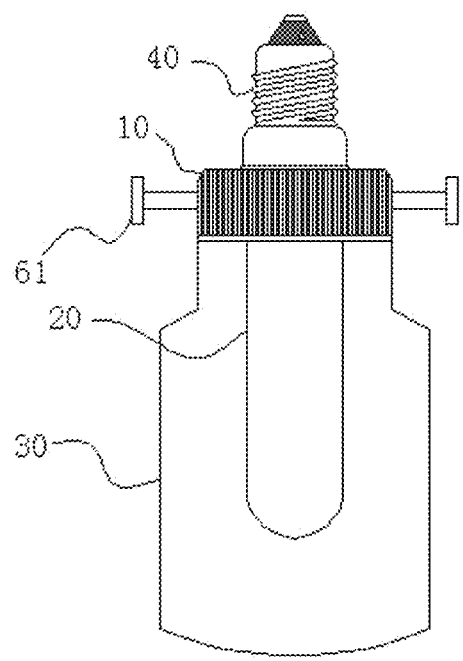
Figure 6:
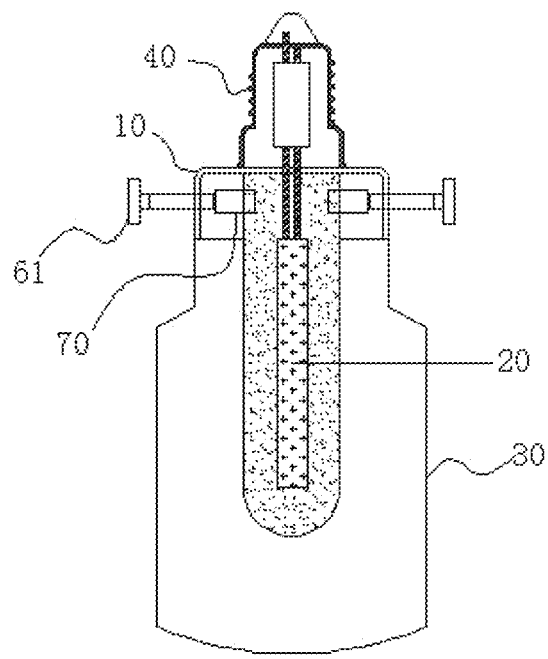
Figure 7:
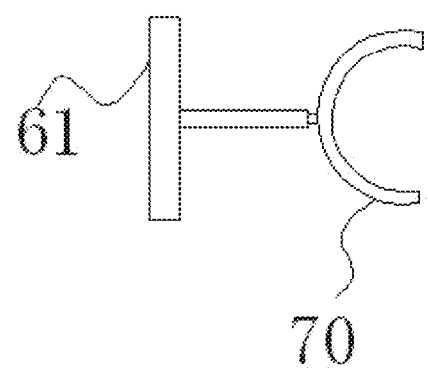

Some of the embodiments will be described in detail, with reference to the following figures, wherein like designations denote like members, wherein:

FIG. 1 is the schematic diagram of the embodiment 1;
FIG. 2 is the section view of the embodiment 1;
FIG. 3 is the schematic diagram of the embodiment 2;
FIG. 4 is the section view of the embodiment 2;
FIG. 5 is the schematic diagram of the embodiment 3;
FIG. 6 is the section view of the embodiment 3; and.
FIG. 7 is the top view of adjusting bolts and arc-shaped support pieces in the embodiment 3.

DETAILED DESCRIPTION

Embodiment 1

As shown in FIG. 1 and FIG. 2, a filament lamp set in a drink bottle comprises a light emitting unit 20, wherein the outer side of the light emitting unit 20 is sleeved by a connecting mechanism 10 which can be connected and fixed with the mouth of a bottle body 30; an opening is formed in at least one end of the connecting mechanism 10, and the light emitting unit 20 extends out from the opening.

The connecting mechanism 10 is a hollow body with internal threads 11, wherein a gap to be inserted into the mouth of the bottle body is reserved between the connecting mechanism 10 and the light emitting unit 20, and the internal threads 11 are matched with external threads at the mouth of the bottle body 30. A connecting head 40 which can be connected with an external lamp base is arranged at one end of the light emitting unit 20, and the connecting head 40 protrudes from the connecting mechanism. The light emitting unit 20 is an LED lamp. The connecting mechanism 10 is a heat conductor.

The model of the connecting head 40 can be E11-E40, G10, B22 and B25×26. The diameter of the internal threads 11 of the connecting mechanism 10 can be 28 mm or 35 mm. The shell of the light emitting unit 20 can be made from epoxy resin in a sealed manner, and can also be made of plastic or glass.

The connecting head 40 is installed on a lamp base. The electric energy can be transmitted to the light emitting unit 20 through a power supply 401 and an electric wire 402, and the connecting head 40 can be a lamp holder of a general lamp.

The connecting mechanism 10 can also be a bottle cap of a common drink bottle. The light emitting unit 20 runs through the bottle cap and gets fixed, and subsequently sleeved by the bottle body 30, which is to be screwed into the bottle cap to get fixed.

The bottle body adopts the common drink bottle, by which the connecting mechanism can be matched with the mouth of the bottle so as to fix the bottle body in the connecting mechanism. In addition, the light emitting unit is sleeved by the bottle body. Based on the decorative patterns, colors and the like on the bottle body, different effects can be achieved by the emitted light and faculae, thus achieving the purpose of decoration.

Embodiment 2

As shown in FIG. 3 and FIG. 4, the filament lamp set in a drink bottle comprises a light emitting unit 20, wherein a connecting mechanism 10 is arranged on the outer side of the light emitting unit 20; an opening is formed in at least one end of the connecting mechanism 10; the light emitting unit 20 extends out from the opening; the connecting mechanism 10 is fixedly connected with the mouth of a bottle body 30, wherein the side wall of the connecting mechanism 10 is provided with threaded holes, inside which the adjusting bolts that can move along the threaded holes are arranged. The adjusting bolt 60 penetrates through the side wall of the connecting mechanism; one end inside the connecting mechanism 10, of the adjusting bolt 60, is taper-shaped, and the connecting mechanism 10 is a heat conductor.

The connecting head 40 is installed on a lamp base. The electric energy can be transmitted to the light emitting unit 20 through a power supply 401 or an electric wire.

In the present embodiment, the connecting mechanism 10 is generally arranged to install the plastic bottle body 30. First, the light emitting unit 20 is sleeved by the bottle body 30. Second, the mouth of the bottle extends into the connecting mechanism 10. Third, by rotating the adjusting bolt 60, the taper-shaped point of the adjusting bolt 60 can be inserted into the side wall of the mouth of the bottle body 30, so that the bottle body 30 can be fixed without falling off.

The bottle body adopts the common drink bottle, by which the connecting mechanism can be matched with the mouth of the bottle so as to fix the bottle body in the connecting mechanism. In addition, the light emitting unit is sleeved by the bottle body. Based on the decorative patterns, colors and the like on the bottle body, different effects can be achieved by the emitted light and faculae, thus achieving the purpose of decoration.

Embodiment 3

As shown in FIG. 5-7, a filament lamp set in a drink bottle comprises a light emitting unit 20, wherein a connecting mechanism 10 is arranged on the outer side of the light emitting unit 20; an opening is formed in at least one end of the connecting mechanism 10; the light emitting unit 20 extends out from the opening; the connecting mechanism 10 is fixedly connected with the mouth of a bottle body 30, wherein the side wall of the connecting mechanism 10 is provided with threaded holes, inside which the adjusting bolts that can move along the threaded holes are arranged. The adjusting bolt 61 penetrates through the side wall of the connecting mechanism. One end inside the connecting mechanism 10, of the adjusting bolt 61, is sleeved by an arc-shaped support piece 70 in the axial direction; the adjusting bolt 61 can rotate relative to the arc-shaped support piece 70, and the arc-shaped support piece 70 closely contact with the side wall of the opening of the bottle body 30.

The connecting head 40 is installed on a lamp base. The electric energy can be transmitted to the light emitting unit 20 through a power supply 401 or an electric wire.

By rotating the adjusting bolt 61, the arc-shaped support piece 70 can be driven to move. When the mouth of the drink bottle extends into the connecting mechanism 10, the adjusting bolt 61 can be rotated to enable the arc-shaped support piece 70 to stick close to the side wall of the mouth and to be clamped at the convex part of the mouth, and then the bottle body 30 can be fixed on the connecting mechanism 10. The bottle body 30 can be supported by the arc-shaped support pieces 70 that are symmetrically arranged on two sides of the connecting mechanism 10, and the arc-shaped support pieces 70 can be applicable to mouths of different sizes when arranged with certain radians.

The present invention is not limited to the above embodiments. All modifications and changes of the present invention made without departing from the spirit of the disclosure or from the scope of the appended claims and equivalent technologies of the present invention shall fall within the protective scope of the claims of the present invention.

What is claimed is:

1. A bottle filament lamp, comprising a light emitting unit, wherein an outer side of the light emitting unit is sleeved by a connecting mechanism which is connected and fixed with a mouth of a bottle body; an opening is formed in at least one end of the connecting mechanism; the light emitting unit extends out from the opening;
   wherein the connecting mechanism is a barrel, a side wall of the connecting mechanism is provided with threaded holes, inside which adjusting bolts that can move along the threaded holes are arranged, and the adjusting bolts penetrate through the side wall of the connecting mechanism.

2. The bottle filament lamp according to claim 1, wherein the connecting mechanism is a hollow body with internal threads; a gap to be inserted into the mouth of the bottle body is reserved between the connecting mechanism and the light emitting unit; and the internal threads are matched with external threads at the mouth of the bottle body.

3. The bottle filament lamp according to claim 1, wherein a connecting head which can be connected with an external lamp base is arranged at one end of the light emitting unit, and the connecting head protrudes from the connecting mechanism.

4. The bottle filament lamp according to claim 1, wherein the light emitting unit is an LED lamp.

5. The bottle filament lamp according to claim 1, wherein one end inside the connecting mechanism, of each adjusting bolt, is taper-shaped.

6. The bottle filament lamp according to claim 1, wherein one end inside the connecting mechanism, of each adjusting bolt, is sleeved by an arc-shaped support piece in an axial direction; the adjusting bolts can rotate relative to the arc-shaped support pieces, and the arc-shaped support pieces closely contact with the side wall of the opening of the bottle body.

* * * * *